(12) United States Patent
Busuioc et al.

(10) Patent No.: US 9,891,315 B2
(45) Date of Patent: Feb. 13, 2018

(54) CONFORMAL AND CONFIGURABLE MILLIMETER-WAVE INTEGRATED ARRAY RADAR IN A COMPACT PACKAGE

(71) Applicant: Northeastern University, Boston, MA (US)

(72) Inventors: Dan Busuioc, Brookline, MA (US); Ming Wang, Stoneham, MA (US); Ralf Birken, Somerville, MA (US)

(73) Assignee: Northeastern University, Boston, MA (US)

(\*) Notice: Subject to any disclaimer, the term of this patent is extended or adjusted under 35 U.S.C. 154(b) by 416 days.

(21) Appl. No.: 14/386,890

(22) PCT Filed: Mar. 22, 2013

(86) PCT No.: PCT/US2013/033538
§ 371 (c)(1),
(2) Date: Sep. 22, 2014

(87) PCT Pub. No.: WO2013/142807
PCT Pub. Date: Sep. 26, 2013

(65) Prior Publication Data
US 2015/0042506 A1  Feb. 12, 2015

Related U.S. Application Data

(60) Provisional application No. 61/614,057, filed on Mar. 22, 2012.

(51) Int. Cl.
*G01S 13/93* (2006.01)
*G01S 7/03* (2006.01)
*H01Q 1/32* (2006.01)
*H01Q 21/06* (2006.01)

(52) U.S. Cl.
CPC ............ *G01S 13/931* (2013.01); *G01S 7/032* (2013.01); *H01Q 1/3233* (2013.01); *H01Q 21/065* (2013.01); *G01S 2013/9357* (2013.01)

(58) Field of Classification Search
CPC .................. G01S 13/931; G01S 7/032; G01S 2013/9357; H01Q 1/3233; H01Q 21/065
USPC ........................................................ 342/70
See application file for complete search history.

(56) References Cited

U.S. PATENT DOCUMENTS

| | | | |
|---|---|---|---|
| 5,818,383 A * | 10/1998 | Stockburger | G01S 3/46 342/109 |
| 6,073,078 A | 6/2000 | Kitahara et al. | |
| 6,501,415 B1 * | 12/2002 | Viana | B60K 31/0008 342/175 |
| 6,577,269 B2 | 6/2003 | Woodington et al. | |
| 6,810,330 B2 | 10/2004 | Matsuura | |
| 2009/0243948 A1 * | 10/2009 | Schmidt | G01S 7/032 343/753 |
| 2010/0020581 A1 * | 1/2010 | Mazzola | H02M 3/33569 363/132 |

(Continued)

*Primary Examiner* — Timothy A Brainard
(74) *Attorney, Agent, or Firm* — Posternak Blankstein & Lund LLP

(57) ABSTRACT

The invention provides a compact, high-frequency, transmit and receive millimeter-wave radar sensor device, system, and method of use. The sensor can operate at a variety of distances, speeds, and resolutions depending on the hardware components selected in a given implementation. The hardware and software architecture is generic and can be tailored to required applications.

19 Claims, 5 Drawing Sheets

(56) References Cited

U.S. PATENT DOCUMENTS

| | | | |
|---|---|---|---|
| 2010/0076641 A1* | 3/2010 | Van Den Berg | A01K 1/01 701/26 |
| 2010/0141479 A1* | 6/2010 | Arnold | G01S 13/42 340/936 |
| 2010/0188504 A1* | 7/2010 | Dimsdale | G01C 11/06 348/142 |
| 2011/0199254 A1* | 8/2011 | Bishop | G01S 13/89 342/179 |
| 2012/0229330 A1* | 9/2012 | Grebennikov | G01S 7/034 342/175 |
| 2014/0350832 A1* | 11/2014 | Johnson | G08G 1/0104 701/118 |

* cited by examiner

CONFORMAL AND CONFIGURABLE MILLIMETER-WAVE INTEGRATED ARRAY RADAR IN A COMPACT PACKAGE

CROSS REFERENCE TO RELATED APPLICATIONS

This application claims the priority of U.S. Provisional Application No. 61/614,057 filed Mar. 22, 2012 and entitled "Conformable & Configurable Millimeter Wave Integrated Array Radar in a Compact Package for Nondestructive Testing and Remote Sensing", the whole of which is hereby incorporated by reference.

BACKGROUND

For use in collecting data on roads and road surfaces, there are currently no automated methods that permit large-scale material characterization in the field. Skid resistance is usually determined through contact methods based on friction, which is poorly suited for high-speed or large-scale data collection. Ground radar methods require bulky hardware and extensive mechanical support; they also provide excess data which are not necessary for a quick estimation or verification of surface conditions. Optical techniques are limited to surface features and require substantial processing; they also are expensive because of the large amount of data collected. Optical methods can yield false positives because of artifacts and features that are often misidentified by the imaging algorithms employed. Thus, there remains a need for data collection apparatus and methods that are suitable for high-speed and large-scale data collection of road condition, road surface features, and road subsurface characteristics.

SUMMARY OF THE INVENTION

The invention provides a compact, high-frequency, transmit and receive millimeter-wave radar sensor device, system, and related methods. The sensor can operate in a moving vehicle at a variety of distances, speeds, and resolutions depending on the hardware components selected in a given implementation. The hardware and software architecture is generic and can be tailored to required applications.

One aspect of the invention is a compact millimeter-wave radar device. The device includes the following components mounted on a single, two-dimensional, multi-layer printed circuit board: a two-dimensional configurable antenna module; a combined transmit/receive module; a data reduction and analysis module: a calibration module; and a user interface module. The radar device operates at a center frequency of from about 10 GHz to about 100 GHz; in one embodiment, the center frequency is about 24 GHz. The bandwidth of the device is from about 100 MHz to about 25% of the center frequency. In certain embodiments, the radar device is capable of detecting structural features with a resolution of less than 1 mm. In some embodiments, the antenna of the device is dynamically configurable and has a variable depth of field. The depth of field can range, for example, from about 10 cm to about 100 cm. In some embodiments, the device does not perform imaging or imaging analysis. In certain embodiments, the device operates, collects data, and analyzes data while the vehicle is moving at ordinary highway speeds.

In certain embodiments the device is configured for mounting in a motor vehicle, on a motor vehicle, or under a motor vehicle, and is capable of determining a roadway characteristic or a characteristic of the vehicle environment. For example, in certain embodiments the device is capable of determining a roadway characteristic such as pavement water content, surface ice, surface water, pavement cracks (microcracks or macrocracks), ruts, potholes, skid resistance, estimated braking distance, surface resistivity, surface conductivity, pavement dielectric constant, or surface roughness. In certain embodiments the radar device is capable of determining the presence of obstacles in the vicinity of the vehicle.

The device typically includes software and/or firmware for controlling operation of the device, data collection, and/or data analysis. In some embodiments, the device is user programmable. Certain embodiments include a calibration that assists in characterizing roadway or other vehicle environmental characteristics based on the received radar signal; the calibration can be provided by the user or can be in the form of a pre-calibration based on laboratory data or field-collected data.

The radar device of the present invention is compact. In some embodiments, the device has dimensions not greater than 100 mm×40 mm×5 mm. In some embodiments, the device weighs less than 100 g. In some embodiments, the device is mounted in a housing, such as a hermetically sealed housing. In some embodiments, the circuit board of the device is flexible and configured to conform to a curved surface, such as a curved surface on which it is mounted. In other embodiments the circuit board is rigid and usually planar. In some embodiments, all the device components are mounted on a single printed circuit board. The board is a multilayer board that includes a control plane and an internal communications plane. In certain embodiments, the board contains the antenna module on one side and other circuitry on the other side. In some embodiments, the device includes a connection for input, such as instructions or data from a user or a remotely located control center, and/or an output connection, such as for data transmission to a user or remotely located control center. The input and/or output connections can be hard wired to other components or can communicate with them by wireless transmission.

Another aspect of the invention is a system for remote sensing by radar from a moving vehicle. The system includes one or more millimeter-wave radar devices as described above and a computer for analysis of the data output from the radar devices. In some embodiments the system includes a plurality of such radar devices, which can be mounted in an array, such as a linear array or another pattern such as a zig-zag pattern, so as to increase the area monitored. The computer can receive and coordinate data from a plurality of radar devices to yield a single data set or a collection of related data. In some embodiments the system includes a display device, which may be within the vehicle or at a remote location separate from the vehicle. In some embodiments, the system includes a tow-behind trailer in which the devices are mounted. The system may also include a vehicle, such as a car, truck, van, or other vehicle that contains the other system components and transports them across a road or series of roads.

Yet another aspect of the invention is a method of remotely determining a roadway characteristic from a moving vehicle using the radar device described above. The method includes the steps of: (a) directing a millimeter wave radar emission from the antenna and transmit/receive modules of the device mounted on a moving vehicle at a roadway surface; (b) receiving a radar reflection of the emission transmitted in step (a) using the antenna and transmit/receive modules of the device; (c) multiplying the radar reflection by the radar emission to obtain a low frequency signal using the data reduction and analysis module of the device; (d) digitizing the low frequency signal and calculating a fast Fourier transform (FFT) thereof using the data reduction and analysis module of the device; and (e) comparing the FFT to a library of FFT data representing a plurality of roadway conditions using the calibration module of the device to determine a roadway characteristic. In certain embodiments, the method further includes the step (b1) of directing a laser beam at the roadway surface and detecting a signal from the laser reflected from the roadway surface. The reflected laser signal can be compared to a library of reflected laser signals representing a plurality of roadway conditions so as to determine a roadway characteristic for comparison to the roadway characteristic determined in step (e). The reflected laser signal also can be used to calibrate or modify the radar FFT data in step (d) and/or step (e). In some embodiments, the reflected laser signal is used to determine the distance to the roadway surface, and the distance measurement is used to calibrate or modify the radar FFT data in step (d) and/or step (e). In certain embodiments, the method further includes displaying results, such as a roadway characteristic or a symbol or expression representing a roadway characteristic, on a display, such as a display screen in the vehicle. In various embodiments, the roadway characteristic detected or characterized by the method is pavement water content, the presence or absence of surface ice and/or surface water, the presence or extent of pavement microcracks or macrocracks, ruts, potholes, skid resistance of a roadway surface, estimated braking distance of the vehicle in which the device is mounted, surface resistivity and/or surface conductivity of a roadway, pavement dielectric constant of a roadway, and surface roughness of a roadway.

Still another aspect of the invention is a method of remotely detecting an obstacle in the vicinity of a moving vehicle using the radar device described above. The method includes the steps of: (a) directing a millimeter wave radar emission from the antenna and transmit/receive modules of the device mounted on a moving vehicle at a region of space in the vicinity of the moving vehicle; (b) receiving a radar reflection of the emission transmitted in step (a) using the antenna and transmit/receive modules of the device; (c) multiplying the radar reflection by the radar emission to obtain a low frequency signal using the data reduction and analysis module of the device; (d) digitizing the low frequency signal and calculating a fast Fourier transform (FFT) thereof using the data reduction and analysis module of the device; and (e) comparing the FFT to a library of FFT data representing a plurality of potential obstacles using the calibration module of the device to detect an obstacle in the vicinity of the vehicle. The method is capable of detecting obstacles including a human or animal, another vehicle, a guard rail, a curb, a wall, a barrier, a post, a column, a piece of construction equipment, a building, a tree, and a utility pole.

BRIEF DESCRIPTION OF THE DRAWINGS

FIG. 3 shows photographs of an embodiment of a multilayer printed circuit board of a radar device of the invention.

DETAILED DESCRIPTION OF THE INVENTION

Figure 1:
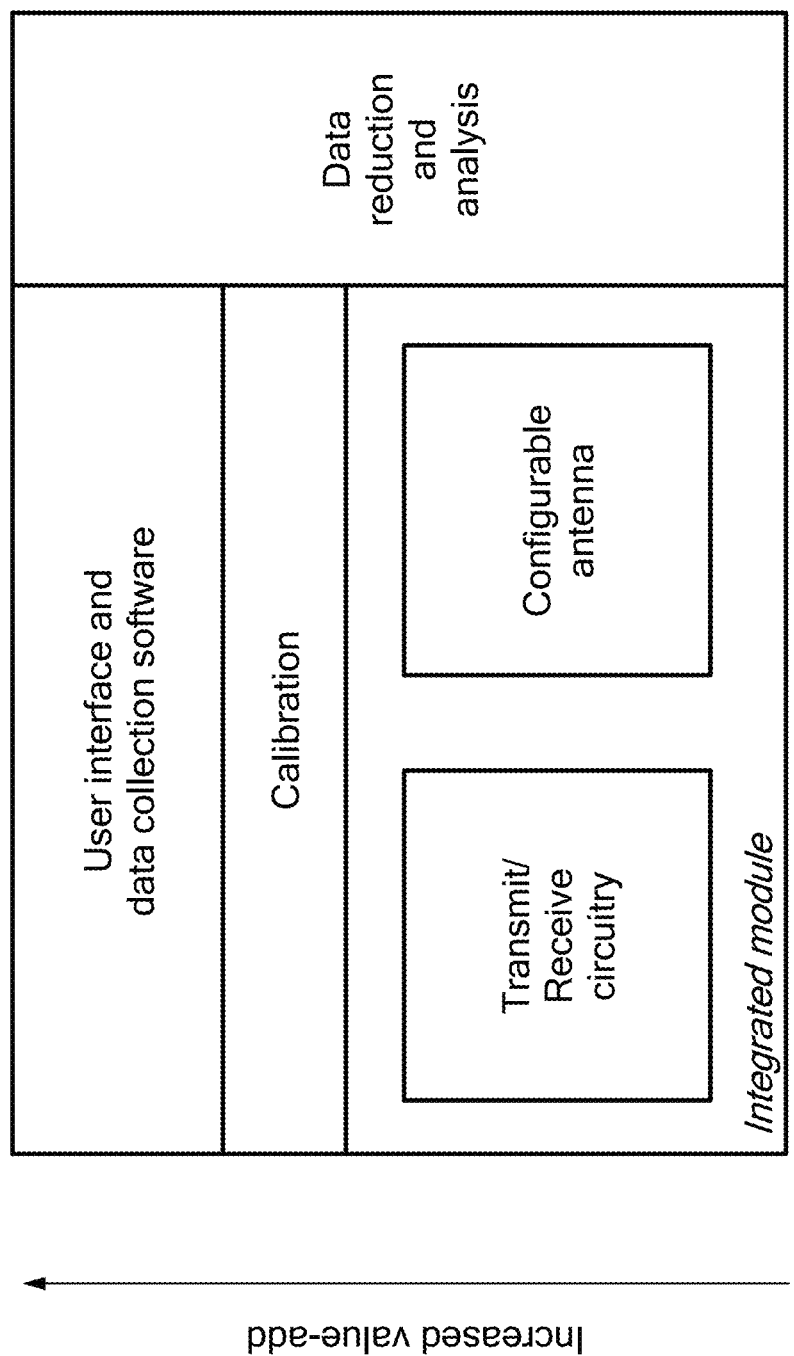
FIG. 1 shows a block diagram of an integrated millimeter band radar device of the invention.
Figure 2:
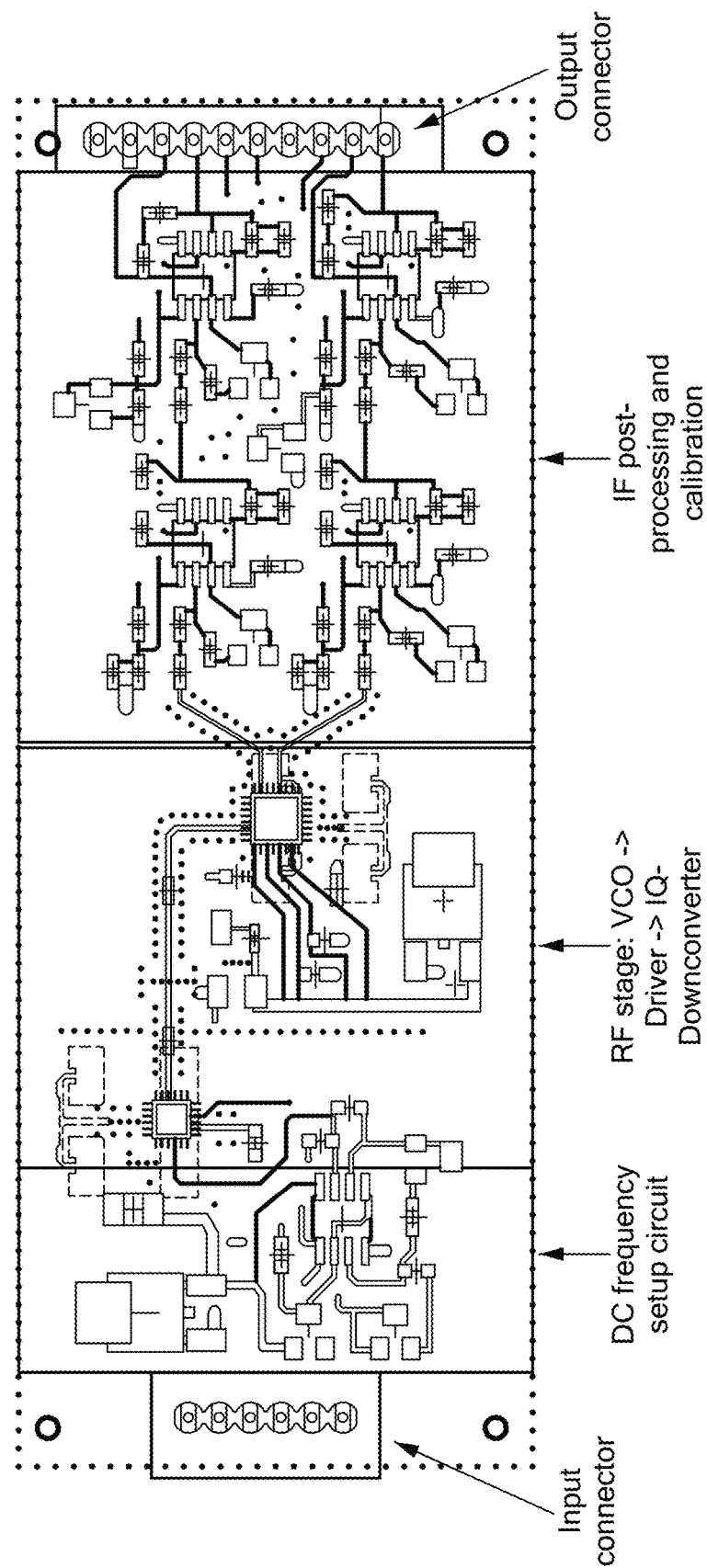
FIG. 2 shows a diagram of the layout of an embodiment of the printed circuit board of a radar device of the invention.
Figure 3C:
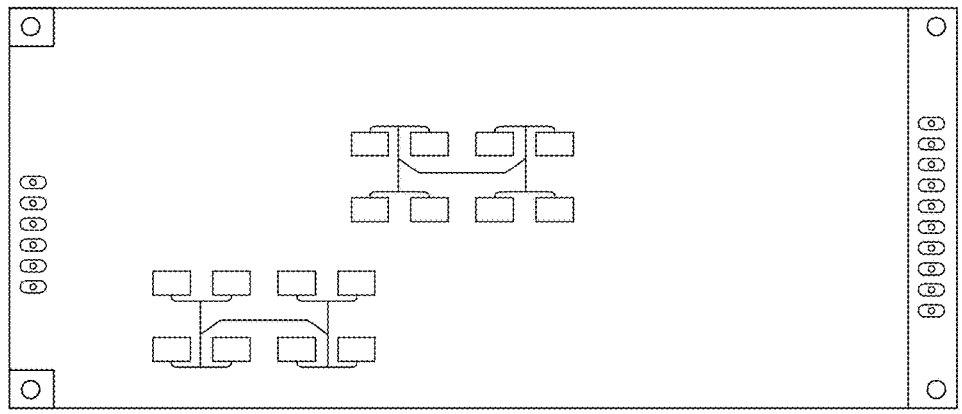
FIG. 3C shows the other side of the board with phased array antenna elements.
Figure 3B:
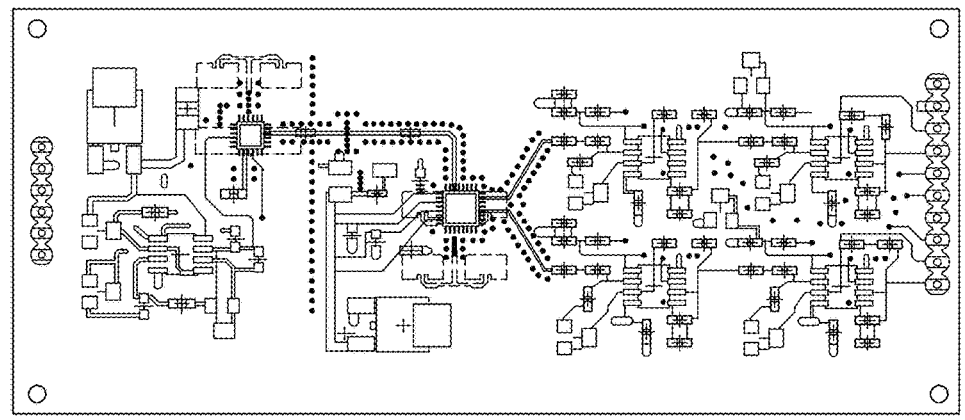
FIG. 3B shows the component side of the board as fabricated.
Figure 3A:
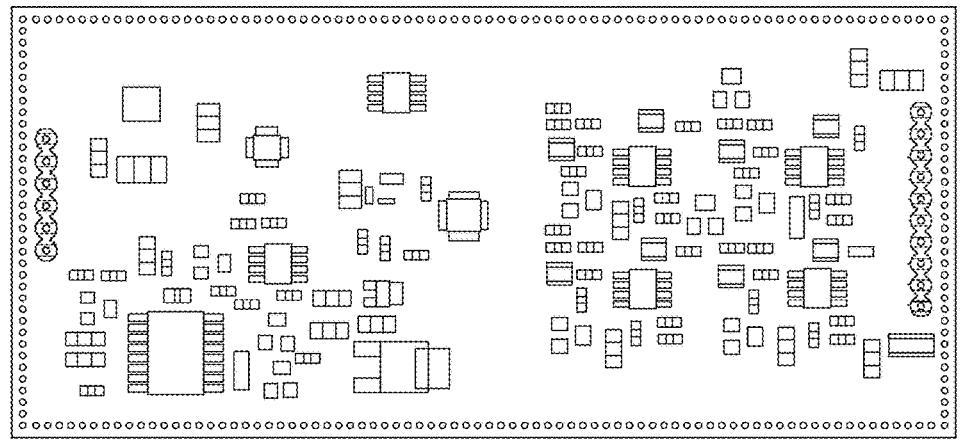
FIG. 3A shows the through-layer view of the circuit board.
Figure 4A:
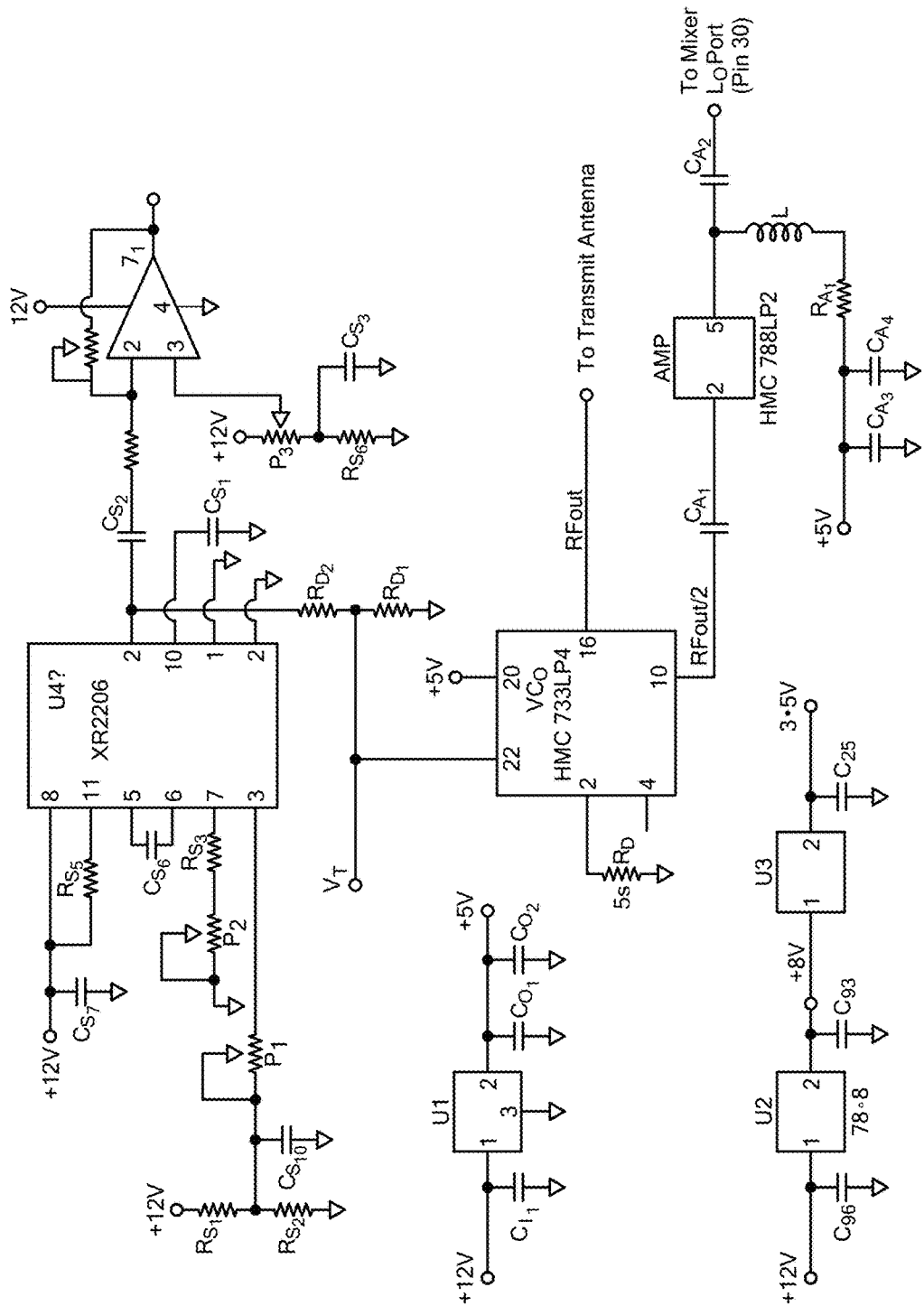
FIGS. 4A and 4B show a circuit diagram for an embodiment of a printed circuit board of a radar device of the invention.
Figure 4B:
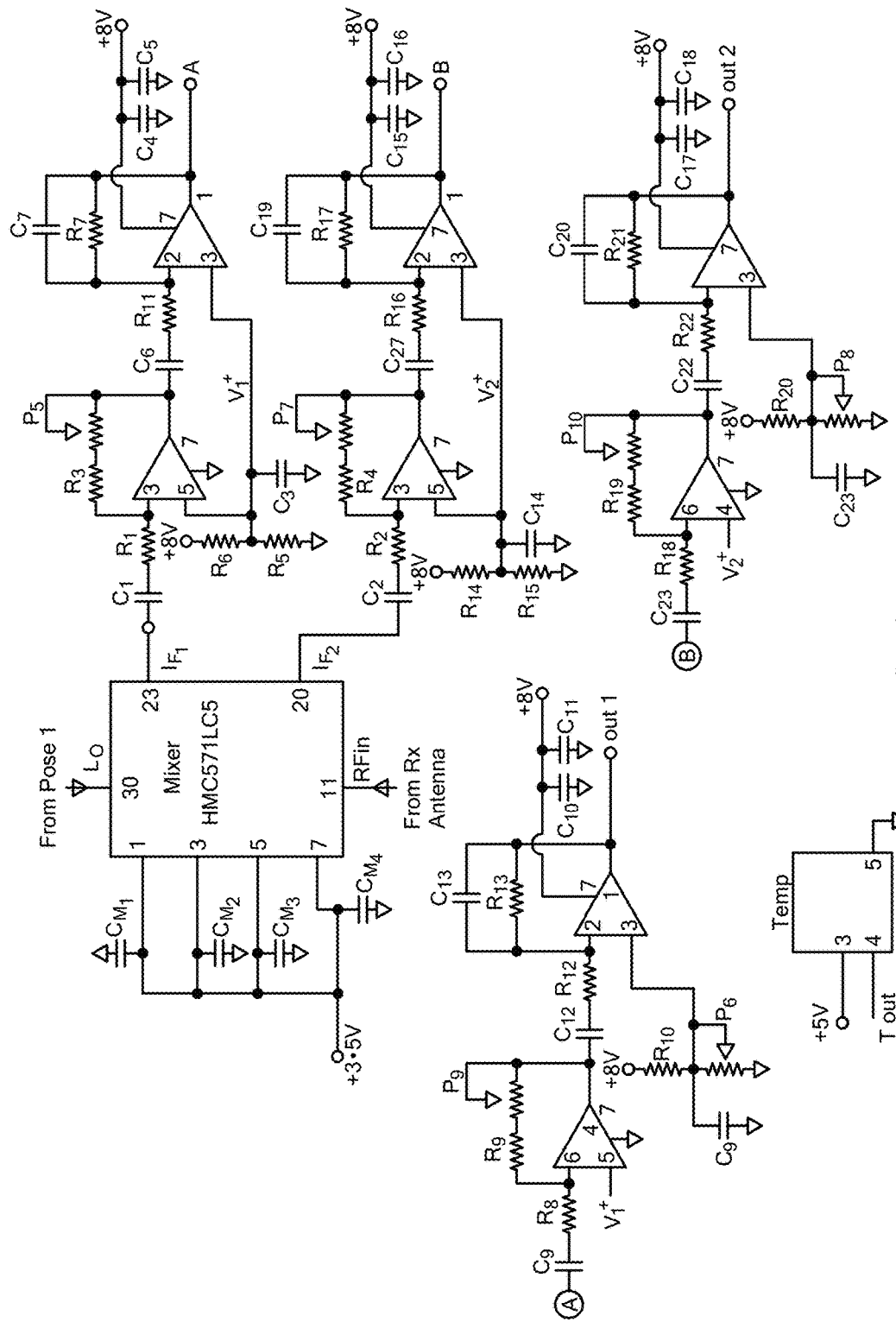

The invention provides a compact, low-cost, millimeter-wave radar transceiver device having all components on a single multilayer printed circuit board. The board includes a two-dimensional configurable antenna module, a combined transmit/receive module, a data reduction and analysis module, a calibration module, and a user interface module. The device is designed to provide data collection and analysis in a single unit. According to a preferred method of analysis, the data are transformed by multiplying the radar reflection signal from a target by the radar emission signal of the device, and calculating a fast Fourier transform (FFT) of the resulting product. The FFT result is compared to a library of calibrated FFT results to identify a structural characteristic of the target. FIG. 1 shows a block diagram that illustrates these modules schematically and how they can be functionally and structurally integrated into a single device. FIG. 2 shows a layout of one embodiment of the circuit board. FIG. 3 shows an actual multilayer circuit board of the invention, and FIG. 4 shows a circuit diagram for a circuit board of the invention.

The device is particularly well-suited for identifying roadway characteristics, including pavement water content, surface ice, surface water, pavement microcracks, pavement macrocracks, ruts, potholes, skid resistance, estimated braking distance, surface resistivity, surface conductivity, pavement dielectric constant, and surface roughness. The radar device also can detect obstacles in the environment of a vehicle, such as a human or animal, another vehicle, a guard rail, a curb, a wall, a barrier, a post, a column, a piece of construction equipment, a building, a tree, or a utility pole. The device can be mounted on a moving motor vehicle, and data can be collected and analyzed at ordinary highway speeds (e.g., greater than 50, or up to 55, 60, 65, or 70 miles/hr or more).

The antenna module preferably includes a phased array antenna. The antenna can include from 1 to N elements (typically N is less than 100), and the elements are preferably distributed in a linear, rectangular, trapezoidal, or circular array on the circuit board of the radar device. The elements can be rectangular or circular, elliptical or custom-designed patch antennas, and they can be fed through a parallel or series feed, or a combination of parallel-series feed. Through the use of phase shifting, the emitted radar beam can be focused and directed onto a surface or object in the near environment of the device, or of a vehicle in, on, or beneath which the device is mounted. The antenna array can be planar or, if a flexible circuit board is used, the antenna can take on a non-planar (e.g., curved) shape. The antenna can be configured by varying the number and position of active elements together with phase shifting, so that the antenna is rendered sensitive to the type and proximity of desired target structure(s). These adaptations can be performed "on the fly" by the transmit/receive module which controls transmission of radar emissions through the antenna and reception of radar reflections through the antenna. Preferably, the antenna module is on one surface of a multilayer circuit board, while most or all of the remaining circuit components are disposed on the opposite surface of the board, or located within the board laminate. Circuit components can be either surface-mounted or through-hole mounted.

The data reduction and analysis module performs the operations indicated above, or other user-defined data reduction and analysis. In some embodiments, the user can input desired data reduction and analysis parameters or algorithms, which are then executed by the data reduction and analysis module. This module can be located on the circuit side of the board or embedded into the inner layers of the printed circuit board. While in some embodiments the use of radar can be combined with collection of image data through a camera, in preferred embodiments there is no image collection or processing, as that would greatly slow the processing of data and increase the need for additional memory on the device. A major advantage of the present invention is the high speed of data collection and processing and the low cost of the device, and this is enabled in part by reliance on the use of data reduction and determination of FFT profiles that can be compared to calibrated results stored onboard.

The calibration module accepts the reduced and transformed data from the data reduction and analysis module and compares the transformed data to an onboard library of stored and calibrated data. The calibrated data can be obtained, for example, by using the same device under controlled conditions to detect known and/or standardized structures representing the roadway characteristics and/or vehicle environmental characteristics (e.g., obstacles) sought to be analyzed or detected. The calibrations can be performed under controlled laboratory conditions, or out "in the field" (i.e., outdoors under actual driving conditions). Alternatively, the user can input their own calibrations, e.g., as digital files, through the user interface module.

The user interface module includes one or more input connectors and electronic components through which the user can input selections for controlling operation of the radar device (e.g., choosing an operation mode, type of target to be detected, radar frequency band, resolution, or depth of field) and inputting parameters, choice of algorithms, calibrations, and the like. Similarly, the user interface can include one or more output connectors through which reduced or transformed data or identified target characteristics can be displayed (e.g., on a display screen built into the vehicle or on a smart phone, tablet computer, notebook computer, or remote computer workstation). User input can be mediated by controls such as buttons, dials, slides, a touch screen, and the like, or can be entered via wireless communications. Similarly, data output can be sent directly to a display screen (which can be the same screen, such as a touch screen, computer, tablet, or smart phone used for input) connected to the radar device by wires or cables or via wireless transmission. Alternatively, both user input and data output can be by means of wireless communications with a remote computer or control center.

The millimeter-wave (e.g., 24 GHz, but not limited to this frequency) transmit/receive module with integrated, configurable antenna can be used for a variety of applications, such as perimeter defense, traffic safety, vehicle radar (e.g., wideband, with imaging capability), road infrastructure monitoring, and the like, The radar device operates in the unlicensed Industrial, Scientific and Medical (ISM) band and works by generating a millimeter wave (e.g., 24 GHz) frequency signal that is transmitted towards a target, while a reflected signal is received and processed in order to describe the target under test. The integration of three different components—hardware, software/firmware, and data reduction and analysis—into a single unit is a major advantage of the invention.

The millimeter-wave frequency applied to sensor technology provides the following advantages: accuracy, compactness, robustness, and manufacturing flexibility. Sensors built to work in this frequency range have a higher accuracy and resolution (to less than 1 mm; resolution increases with increasing frequency over the range 10-100 GHz), They also can be compact and robust, with miniaturized devices that can reach a few cubic cm. Furthermore, the commercial availability of semiconductor chip sets in this frequency range from more than one supplier allow for a cost-effective bill-of-materials for the sensor systems.

One application of the sensor device is material characterization, more specifically identification and classification of various sample materials which constitute an equivalent device or target under test (DUT). The DUT is placed in the proximity of the sensor system, and complex signals are reflected from the DUT are processed by the sensor system. The resulting data are analyzed, and unique deterministic decisions are made depending on the sensor goals. For example, detecting skid resistance in pavement (as a potential civil engineering application) requires the identification of material (pavement) characteristics, such as dielectric constant, surface resistivity/conductivity, as well as other information such as surface roughness of the pavement. The millimeter wave technology allows a non-destructive non-contact methodology that has not been used previously. The output data from the sensor module can provide a substantial data-rate system, requiring complex high speed analog to digital converter (ADC). The data also can be filtered and parsed for anomalies and outliers, while an averaging algorithm computes the statistically significant information about the DUT. The radar module allows multiple modes of operation with respect to the integrated antennas. These modes allow built-in data averaging across a material surface, thereby reducing complexity of the output data while maintaining accuracy and reliability of the measurement.

While the device can be fabricated and programmed to carry out many possible data reduction and analysis algorithms, one embodiment of such an algorithm operates as follows. The algorithm and data processing are tied together. The sensor itself is operated as a frequency modulated continuous wave system. A standard voltage sweep is used to shift the frequency of a sinusoidal wave across a chosen bandwidth. The bandwidth and speed of the shift result in the application of interest—for example, a larger bandwidth results in a finer range of resolutions (i.e., depth of field). The outgoing signal is amplified by the transmit antenna and propagated through the medium (air) towards the target. The size of the antenna and distribution of its elements aid in focusing/defocusing of the signal (hence the antenna is reconfigurable). Once the signal is received, it is mixed (multiplied) by the sent signal in order to obtain a low-frequency signal which is then digitized and the fast fourier transform (FFT) is applied. The algorithm then looks at the FFT fingerprint to evaluate the material information and/or the condition of the surface being measured; this information is looked up a table or database of pre-calibrated materials to match with the FFT information about the material present and to thereby identify the target material or object. The algorithm can be prototyped and refined on a computer connected to the radar sensor, and then software to run the algorithm can be embedded in the data reduction and analysis module of the final device. Thus, with embedded software, the algorithm runs automatically during data collection, without user input or intervention.

As an example of the identification of a roadway characteristic using an algorithm with the device, skid resistance (defined as the cumulative effect of ice, snow, water, loose materials, and the road surface on the traction produced by the wheels of a vehicle) can be determined as a skid coefficient. The skid coefficient is calculated using the algorithm based on information gathered by the radar device on the presence or absence of ice, water, loose materials and road surface texture.

As used herein, "consisting essentially of" does not exclude materials or steps that do not materially affect the basic and novel characteristics of the claim. Any recitation herein of the term "comprising", particularly in a description of components of a composition or in a description of elements of a device, system, or method, can be exchanged with "consisting essentially of" or "consisting of".

While the present invention has been described in conjunction with certain preferred embodiments, one of ordinary skill, after reading the foregoing specification, will be able to effect various changes, substitutions of equivalents, and other alterations to the compositions and methods set forth herein.

The invention claimed is:

1. A compact millimeter-wave radar device comprising the following components on a single two-dimensional multi-layer printed circuit board:
    a two-dimensional configurable antenna module;
    a combined transmit/receive module;
    a data reduction and analysis module:
    a calibration module; and
    a user interface module,
wherein the device operates at a center frequency in the range from about 10 GHz to about 100 GHz, and wherein the device weighs less than 100 g.

2. The radar device of claim 1, wherein the device operates at a center frequency of about 24 GHz.

3. The radar device of claim 1, wherein the device operates at a bandwidth from about 100 MHz to about 25% of the center frequency.

4. The radar device of claim 1, wherein the device is mounted in, on, or under a motor vehicle and capable of determining a roadway characteristic or a characteristic of the vehicle environment.

5. The radar device of claim 4 that is capable of determining a roadway characteristic selected from the group consisting of pavement water content, surface ice, surface water, pavement microcracks, pavement macrocracks, ruts, potholes, skid resistance, estimated braking distance, surface resistivity, surface conductivity, pavement dielectric constant, and surface roughness.

6. The radar device of claim 4 that is capable of determining the presence of obstacles in the vicinity of the vehicle, and the obstacle is selected from the group consisting of a human or animal, another vehicle, a guard rail, a curb, a wall, a barrier, a post, a column, a piece of construction equipment, a building, a tree, and a utility pole.

7. The radar device of claim 1 that is capable of detecting structural features with a resolution of less than 1 mm.

8. The radar device of claim 1 having dimensions not greater than 100 mm×40 mm×5 mm.

9. The radar device of claim 1, wherein the antenna is dynamically configurable and has a variable depth of field.

10. The radar device of claim 9, wherein the depth of field ranges from about 10 cm to about 100 cm.

11. The radar device of claim 1, wherein the circuit board is flexible and configured to conform to a curved surface.

12. The radar device of claim 1, wherein all components of the device are mounted on said printed circuit board.

13. The radar device of claim 1 that does not involve imaging.

14. The radar device of claim 1 that is mounted in a motor vehicle and operates as the vehicle is driven at ordinary highway speeds.

15. A system for remote sensing by radar from a moving vehicle, the system comprising one or more millimeter-wave radar devices of claim 1 and a computer for analysis of the data output of the one or more radar devices.

16. The system of claim 15, wherein the one or more radar devices are mounted in a trailer towed behind the motor vehicle.

17. The system of claim 15, wherein the computer is remote from the vehicle, and data collected from the one or more radar devices are transmitted wirelessly to the computer.

18. A method of remotely determining a roadway characteristic from a moving vehicle using the radar device of claim 1, the method comprising the steps of:
    (a) directing a millimeter wave radar emission from the antenna and transmit/receive modules of the device mounted on a moving vehicle at a roadway surface;
    (b) receiving a radar reflection of the emission transmitted in step (a) using the antenna and transmit/receive modules of the device;
    (c) multiplying the radar reflection by the radar emission to obtain a low frequency signal using the data reduction and analysis module of the device;
    (d) digitizing the low frequency signal and calculating a fast Fourier transform (FFT) thereof using the data reduction and analysis module of the device; and
    (e) comparing the FFT to a library of FFT data representing a plurality of roadway conditions using the calibration module of the device to determine a roadway characteristic.

19. A method of remotely detecting an obstacle in the vicinity of a moving vehicle using the radar device of claim 1, the method comprising the steps of:
    (a) directing a millimeter wave radar emission from the antenna and transmit/receive modules of the device mounted on a moving vehicle at a region of space in the vicinity of the moving vehicle;
    (b) receiving a radar reflection of the emission transmitted in step (a) using the antenna and transmit/receive modules of the device;
    (c) multiplying the radar reflection by the radar emission to obtain a low frequency signal using the data reduction and analysis module of the device;
    (d) digitizing the low frequency signal and calculating a fast Fourier transform (FFT) thereof using the data reduction and analysis module of the device; and
    (e) comparing the FFT to a library of FFT data representing a plurality of potential obstacles using the calibration module of the device to detect an obstacle in the vicinity of the vehicle.

\* \* \* \* \*